United States Patent [19]

Burkholder

[11] 3,927,124

[45] Dec. 16, 1975

[54] PROCESS FOR THE NEUTRALIZATION OF ALKYL AROMATIC HYDROPEROXIDE REARRANGEMENT REACTION PRODUCTS

[75] Inventor: Ward J. Burkholder, Houston, Tex.

[73] Assignee: The Goodyear Tire and Rubber Company, Akron, Ohio

[22] Filed: Jan. 3, 1973

[21] Appl. No.: 320,807

Related U.S. Application Data

[63] Continuation-in-part of Ser. No. 16,853, March 5, 1970, abandoned.

[52] U.S. Cl. .......... 260/621 A; 260/621 C; 423/276; 423/471; 423/497; 423/499; 423/519; 423/520; 423/545; 423/551; 423/554
[51] Int. Cl.$^2$ .................... C07C 37/08; C07C 37/42; C07C 37/22
[58] Field of Search ..................... 260/621 C, 621 A

[56] References Cited
UNITED STATES PATENTS

| | | | |
|---|---|---|---|
| 2,597,497 | 5/1952 | Joris | 260/621 C |
| 2,663,735 | 12/1953 | Filar et al. | 260/621 C |
| 2,993,074 | 7/1961 | Shepard | 260/621 C X |

*Primary Examiner*—Norman Morgenstern
*Attorney, Agent, or Firm*—Browning & Bushman

[57] ABSTRACT

The rearrangement product mixture resulting from an acid catalyzed rearrangement of an alkyl aromatic hydroperoxide is neutralized by additions of a basic material to the mixture in a two step process. The neutralization is performed in two steps in order to reduce the reaction time and the base requirements and to facilitate better pH control. The salt formed by the reaction of the base with the acid in the reaction mixture is separated from the reaction mixture between steps. The disclosure also encompasses a method for monitoring the pH of the neutralized reaction mixture by diluting a slip stream with water so that conventional pH determination equipment may be employed.

17 Claims, 3 Drawing Figures

INVENTOR
WARD J. BURKHOLDER
BY Donald W. Canady

ATTORNEY

PROCESS FOR THE NEUTRALIZATION OF ALKYL AROMATIC HYDROPEROXIDE REARRANGEMENT REACTION PRODUCTS

CROSS-REFERENCE TO PARENT APPLICATION

This application is a continuation-in-part application of my application Ser. No. 16,853 filed Mar. 5, 1970, now abandoned, for Process for the Neutralization of Rearrangement Reaction Products.

BACKGROUND OF THE INVENTION

In the acid rearrangement of alkyl aromatic hydroperoxides it is desirable to separate the hydroxy aromatic rearrangement product from entrained acid catalyst as soon as production of the desired rearrangement product is optimized, in order to prevent the acid from catalyzing further reactions which result in the production of undesirable by-products and the polymerization and/or further reaction of the hydroxy aromatic products and by-products. Such by-products production and undesirable reactions reduce the yield of hydroxy aromatics, form discoloration products, and present complex separation problems. Also it is desirable to remove or neutralize the sulfuric acid to prevent corrosion of the mechanical portions of the recovery system.

DISCUSSION OF THE PRIOR ART

In the past, various neutralizing agents such as ammonia, alkali and alkali earth metal carbonates, hydroxides, and oxides, for example, calcium carbonate and sodium hydroxide, have been used. Such agents in anhydrous form are solids and insoluble in organic solvents. In reactions of liquid acid with a solid basic material, only the surface of the solid enters into the reaction with the acid and hence the neutralization process is very slow with solid neutralizing agents and requires several times the theoretical amounts of neutralizing agent. Ammonium carbonate has also been used, but the ammonium carbonate solution which forms, tends to volatize to form ammonia and carbon dioxide, which react later to form one or both of the volatile salts ammonium carbonate and ammonium bicarbonate, which may plug up distillation apparatus. Neutralization has been accomplished with ion exchange resin, however, the use of an ion exchange resin bed for neutralization is very costly and requires periodic regeneration of the bed. Also the surface of the resin beads would also be susceptible to fouling.

Although it has been suggested in the prior art to use ammonia as a neutralizing agent, a satisfactory process has not been disclosed.

Heretofore, it has also been found difficult to control the pH in a neutralizer process employing a nonaqueous system, since the pH electrodes of conventional pH control equipment are deteriorated severely in nonaqueous solvents, and the pH meter reading in a nonaqueous system vary from the pH reading of an aqueous solution of comparable acidity.

SUMMARY OF THE INVENTION

According to one embodiment of my present invention, the rearranged product stream is neutralized by treatment with an amount of anhydrous ammonia gas nearly equal to or slightly in excess of the amount stoichiometrically required to convert the acid to its corresponding salt, such as the conversion of sulfuric acid to ammonium sulfate. The ammonium sulfate salt is substantially insoluble in organic solvents and hence can be readily removed from the neutralized product by filtration. The neutralization process can be operated continuously by controlling the amount of ammonia fed to the neutralizer, as required by a reading of the pH meter in contact with the reaction product mixture. Anhydrous ammonia gas is particularly effective as a neutralization agent in my present process since it is readily dispersible in the organic solution. Also, the reaction of ammonia with sulfuric acid does not result in the production of water which would be undesirable as mentioned above, nor is ammonia reactive with the HQ product under the controlled reaction conditions.

The pH meter reading of the neutralization mixture may be maintained at about 3 to 6 preferably within the range of 4.2 to 5.2, by removing a slip stream from the neutralized mixture and diluting the slip stream with an equal part of water, or other electrolyte which is not harmful to the pH meter electrodes. The pH reading of the nonaqueous reaction mixture is not the same as the pH of a corresponding aqueous solution. For example, the aqueous hydroquinone solution removed from a distillation column used to distill off a ketone solvent and into which column water is introduced, (as described in copending application Ser. No. 16,658 filed Mar. 5, 1970) is maintained at a pH of about 4.8 to 5.4, although the pH meter reading of the water diluted slip stream necessary to effect this preferred range, may be somewhat different. If the pH of the aqueous hydroquinone solution is raised above about 5.5 there is a tendency for hydroquinone salts to form, which is undesired where hydroquinone is the product sought.

The pH meter reading of the slip stream mixture may be taken with a conventional pH meter and the amount of ammonia feed is adjusted to maintain the desired pH. The pH meter may be either intermittently or continuously operated. In the latter case, of course, the slip stream would be continuously withdrawn and diluted for pH determination. The ammonia feed may be either manually or automatically controlled in response to the pH meter reading in accordance with conventional control equipment design.

While the base is added to adjust the pH of the rearrangement reaction mixture to about 3 to 6, preferably the base is added to adjust the pH of the mixture to approximately the pH of the salt to be formed in the neutralization reaction, but not in excess of the pH of hydroquinone. The pH of several salts, measured in a 1 percent water solution is as follows:

| | |
|---|---|
| $NaHSO_4$ | 1.40 |
| $Na_2SO_4$ | 5.70 |
| $NH_4HSO_4$ | 1.40 |
| $(NH_4)_2SO_4$ | 5.40 |

The pH of hydroquinone at several concentrations in water solutions, is as follows:

| % HQ | pH |
|---|---|
| 1 | 5.69 |
| 5 | 5.33 |
| 5 (in acetone) | 5.00 |
| 10 | 5.17 |
| 15 | 5.07 |
| 20 | 5.00 |

Other basic gases which are dispersible in organic solutions, such as methylamines and triethylamines, may be used in place of ammonia where desirable. Any inorganic base may be used as the neutralizing agent in my present process, although ammonia is preferred from the process-ease standpoint. Other bases which may be employed include the alkali and alkaline earth metal hydroxides, carbonates, and oxides, such as the hydroxides and carbonates of sodium, calcium, potassium, magnesium, or lithium. The base should be soluble to the extent of at least 25% in water. The neutralizing agent must, of course, be suitable for neutralizing the rearrangement acid catalyst, which generally may be any Lewis acid, such as $H_2SO_4$, $SO_2$, HCl, $BF_3$, $AlCl_3$, etc. although $H_2SO_4$ is preferable from a cost, corrosion, and material handling standpoint.

Preferably, my neutralization process is a two-stage process involving first the conversion of sulfuric acid, for example to the bisulfate, and secondly the conversion of the bisulfate to the sulfate. My two-stage process reduces the neutralization reaction time due to a decrease in the hold up time during which the bisulfate is converted to sulfate. This two-stage process also results in a sharper end point, lends to easier controls, and theoretically reduces the base consumption. According to this method, the amount of base added, for example, ammonia, can be reduced below the amount required stoichiometrically to convert sulfuric acid to ammonium sulfate. By this method, ammonium bisulfate which forms rapidly, is produced as follows:

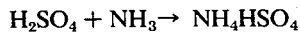

and since the bisulfate is only partially soluble in the organic solvents which are employed with my process, it can be removed by filtration without further conversion to ammonium sulfate. In a second neutralization step, the filtrate is neutralized to convert any of the bisulfate which has dissolved in the solvent, to ammonium sulfate, according to the following reaction:

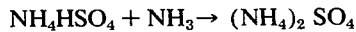

The insoluble ammonium sulfate thus formed is then removed by filtration in a second filtration step. Thus, by this two-stage system, the slow step of neutralizing the insoluble ammonium bisulfate is avoided, the use of excessive quantities of ammonia in the system is avoided, and complete neutralization of sulfuric acid can be effected by less than 100% of the ammonia stoichiometrically required to convert sulfuric acid to ammonium sulfate.

When the base added to neutralize the acid catalyst is added as an aqueous solution of the base, a separate water phase results, which will dissolve the salts formed by the neutralization reaction. Separation of the salts in this case is effected by employing a phase separator instead of a filter or centrifuge.

My present invention may be used to neutralize an alkyl aromatic hydroperoxide rearrangement product mixture, such as the rearrangement of cumene hydroperoxide to phenol, naphthalene hydroperoxide to naphthols, the rearrangement of para diisopropylbenzene dihydroperoxide to hydroquinone, and the rearrangement of m-diisopropylbenzene dihydroperoxide to resorcinol. The rearrangement feed, prior to addition of the acid catalyst thereto to effect rearrangement, is dissolved in a suitable organic solvent such as methyl ethyl ketone or acetone, or mixtures thereof with benzene, toluene, diisopropylbenzene, or xylene.

Preferably, acetone is employed since it is produced in the rearrangement reaction and therefore does not require an additional separation step to effect its separation from the hydroxy benzene product.

The present neutralization method may be practiced either at room temperature or at higher temperatures. The neutralization process will proceed faster at higher temperatures because of the higher rate of diffusion of the ammonia and acid, however, higher temperatures increase the tendency to form side reaction products. On the other hand, the longer reaction times required at lower temperatures also increase by-products formation. Hence it would be desirable to reduce both the reaction time and the temperature. The solubility of ammonium bisulfate increases at higher temperatures and at the higher temperatures, multi-ring compounds and other undesirable by-products tend to form, and hence it is preferable to perform the neutralization at a temperature of between the rearrangement reaction temperature and ambient temperature, that is, between about 200° and 50° F. It is preferable to employ cooling means in the neutralizer rather than add a cooling step, since the addition of a cooling step would increase the reaction time.

The separation or removal of the precipitated solids from the rearrangement reaction mixture, may be accomplished with any conventional filtering, centrifuge or settling apparatus. Suitable filter devices include rotary filters, vacuum filters, and stationary filters. When the salt is dissolved in a separate water phase, the salt is removed by phase separation with conventional phase separation equipment. It is desirable to exclude air from the rearrangement reaction mixture, in order to prevent oxidation of the hydroxy aromatic compound produced.

DESCRIPTION OF THE DRAWINGS

Figure 1:
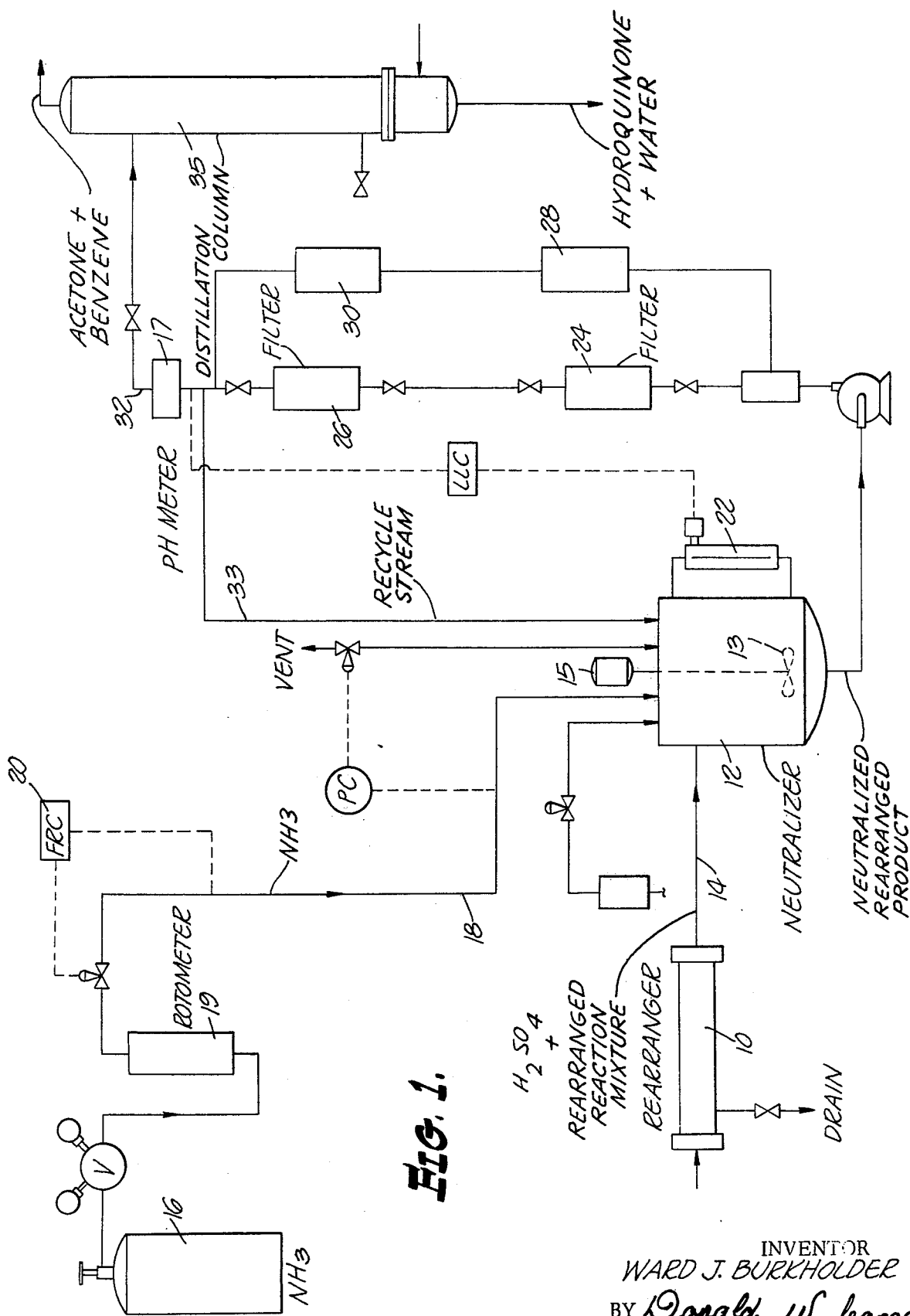
FIG. 1 shows schematically the neutralization process of my present invention as used in conjunction with an acid catalyzed rearrangement process.

In FIG. 1 a rearrangement reaction mixture is continuously fed from the rearrangement reactor 10 to the neutralizer vessel 12 through line 14. The neutralization vessel 12 is equipped with a mechanical stir 13 driven by motor 15, and a liquid level control 22 to control the residence time in the vessel and prevent the vessel from overflowing. Anhydrous ammonia gas is fed to the neutralizer vessel 12 through line 18 from an ammonia storage tank 16. The ammonia flow may be controlled manually or with a flow rate control valve 20 using an orifice meter which may be remotely controlled by an in-line pH meter 17. The ammonia flow into the neutralizer may be measured with a rotometer 19 which indicates the rate of addition of ammonia.

The neutralizer effluent is pumped to a filtering apparatus which preferably contains a course filter element 24 of about 10 microns and a finer mesh filter element 26 of about 5 microns, which catches the smaller solids that pass through the course filter or leak through the seals. When the filter elements 24 and 26 are loaded with filtered solids as may be indicated by a drop in circulation through the flow-meter, the neutralizer effluent is diverted to the alternate set of parallel filters 28 and 30 while the loaded filter elements 24 and 26 are replaced or cleaned. The loaded filter elements may be cleaned by washing with water which dissolves the sulfate salts collected on the filter elements. The filter elements may then be "dried" by rinsing with acetone to remove the water. Prior to washing the filters with water, it is desirable to rinse the filtered materials with acetone to recover any entrained rearrangement product.

The filtered neutralized rearranged product is then fed through line 32 to a distillation column 35 where the solvent is removed by distillation and the hydroquinone dissolved in water preparatory to extraction as taught in the aforementioned co-pending application Ser. No. 16,658. A portion of the neutralized material is recycled to the neutralizer via line 33 to maintain the level in the neutralizer vessel.

Figure 2:
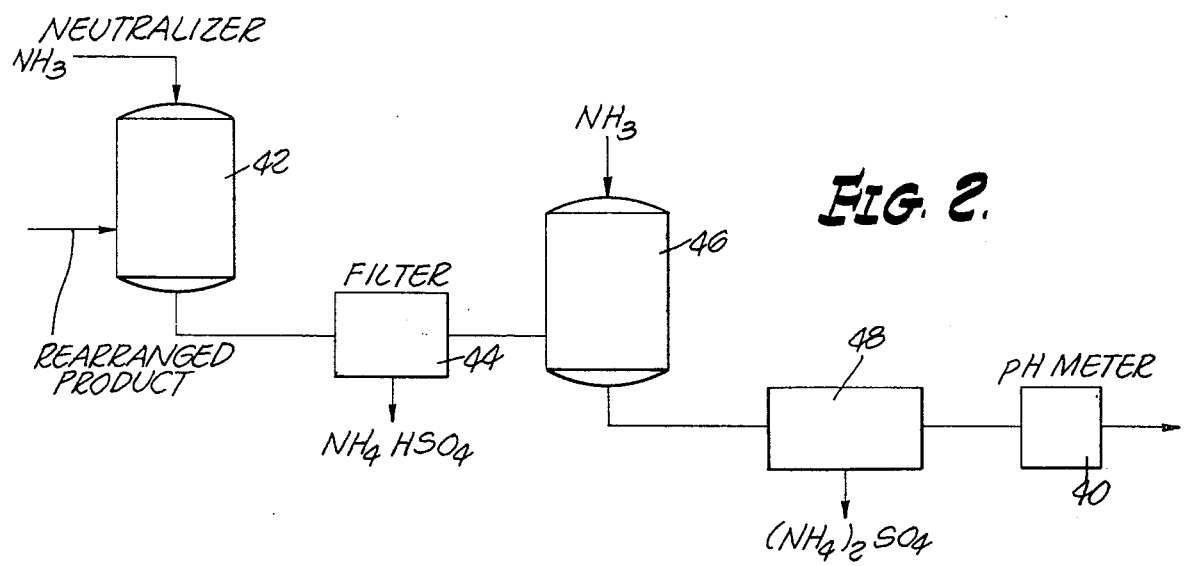
FIG. 2 is a schematic diagram of a two stage neutralization process which is a variation of the process shown in FIG. 1.

FIG. 2 shows a two-stage neutralization in accordance with my invention. The rearrangement product mixture is treated in vessel 42 with ammonia at lower reaction time. The partially neutralized product is filtered by filter 44 to remove the precipitated solids which are principally ammonium bisulfate. The filtrate is then neutralized in vessel 46 and this neutralized product filtered with filter 48.

An in-line pH meter 40 is used to measure the pH value of the neutralizer effluent after filtration.

While measurement of the pH in acetone-benzene solution would be desirable, because of the incompatibility of the pH electrodes with organic solvents, the neutralization is performed by diluting a slip stream from the reaction product mixture with water, and obtaining a pH meter reading of the water diluted reaction mixture.

The reaction mixture may be diluted as required to prevent pH meter electrode deterioration and to obtain a reading which may be correlated to the pH of the subsequent aqueous hydroquinone solution. Preferable a dilution ratio of 1:1 (water: organic solution) or greater is employed, although the dilution should not be so great as to cause a benzene separation or to prevent a meaningful pH meter reading.

The amount of ammonia reacted is controlled by the ammonia flow rate, the residence time in the reactor, and the amount of agitation in the reactor. The residence time is preferably sufficient to permit the reaction to reach equilibrium, which of course varies with the ammonia flow rates, the acid concentration, and the reaction temperature. For each set of conditions, the optimum ammonia addition can be determined according to the desired pH. For example see Example IV. As previously stated, the desired pH meter reading on the neutralized mixture is that reading corresponding to an aqueous hydroquinone solution pH of about 4.8 to 5.4. At higher pH conditions, salts of hydroquinone, or other hydroxy aromatic compounds, may be formed.

The following examples are given with the understanding that the scope of my invention is not to be limited in any way thereto.

EXAMPLE I

A sulfuric acid hydroquinone rearrangement mixture was fed to a 5-gallon agitated reactor which has been purged with nitrogen, and liquid level control to maintain a constant residence time of about 1.2 hours. The neutralizer pressure was maintained with nitrogen and controlled at about 15 psig by a pressure pilot. The apparatus employed is illustrated in FIG. I. The results obtained are tabulated in Table I.

Table I

| Time | NH3 Flow | Temp. | Feed Rate to Rearranger | Conc. $H_2SO_4$ Feed Rate | Product pH |
|---|---|---|---|---|---|
| 2 hrs. | 10 gm/hr. | 85° F | 6,873 gms/hr. | 26.7 gms/hr | 3.9 |
| 4 " | " | " | " | " | 3.9 |
| 6 " | " | " | " | " | 3.8 |
| 8 " | " | " | " | " | 4.0 |
| 10 " | " | " | " | " | 3.9 |
| 12 " | " | " | " | " | 4.0 |
| 14 " | " | " | " | " | 4.1 |
| 16 " | " | " | " | " | 4.2 |
| 18 " | " | " | " | " | 4.0 |
| 20 " | " | " | " | " | 4.1 |
| 22 " | " | " | " | " | 4.1 |
| 24 " | " | " | " | " | 4.1 |
| 26 " | " | " | " | " | 4.1 |
| 28 " | " | " | " | " | 4.0 |
| 30 " | " | " | " | " | 3.9 |
| 32 " | " | " | " | " | 4.2 |
| 34 " | " | " | " | " | 4.0 |

The average analysis of the rearranger feed was:

| Component | Wt.% |
|---|---|
| Benzene | 2.83 |
| Water | 0.80 |
| Di-isopropylbenzene monohydroperoxide | 1.11 |
| hydroxy- hydroperoxy-di-isopropylbenzene | 1.56 |
| Di-isopropylbenzene dihydroperoxide | 7.98 |
| Acetone | 85.72 |

EXAMPLE II 65.26 grams of acetone containing 1.0127 grams of 97.9 percent $H_2SO_4$ was neutralized with 0.2423 grams of $NH_3$. The mixture was agitated and left standing overnight to reach equilibrium. A white precipitate was filtered, vacuum dried at room temperature and weighed to 1.1241 grams. The precipitate was analyzed to be 47.57 Mol % $NH_4HSO_4$ and 52.43 mol % $(NH_4)_2SO_4$. The filtrate contained 0.04503 grams acidity (as $H_2SO_4$), which is equivalent to 4.54% of the original $H_2SO_4$. Hence 95.46% of the acidity was removed by adding 74% of the $NH_3$ theoretically required to neutralize the $H_2SO_4$ to $(NH_4)_2SO_4$. From this it can be calculated that 75% of the $NH_3$ theoretically required would completely neutralize the acid solution. The filtrate was treated with ammonia until the pH meter reading went from below 0 (off scale) to 4.5. During this treatment white solids precipitated which indicated that the $NH_4HSO_4$ dissolved in the filtrate was converted to neutral $(NH_4)_2SO_4$.

EXAMPLE III

The above run was repeated with 20 percent of the $NH_3$ theoretically required, and the solids were filtered immediately and identified as $NH_4HSO_4$. 36.8% of the acidity was removed as insoluble $NH_4HSO_4$ thus confirming the theory that $H_2SO_4$ acidity may be removed with $NH_3$ without complete conversion to $(NH_4)_2SO_4$.

EXAMPLE IV $NH_3$ was slowly bubbled into 800 ml. of rearrangement product solution, containing 0.20 wt % $H_2SO_4$. The batch was stirred and pH electrodes were immersed in it throughout.

The starting pH was less than zero for 35 minutes, at which time it reached 0.40. At this time the pipette, through which $NH_3$ was introduced, plugged. It was cleaned out and the $NH_3$ rate increased. The pH jumped to 0.8.

Readings were taken, without changing the $NH_3$ feed setting, versus time.

| Minutes (cumulative) | pH |
|---|---|
| 0 | 0.80 |
| 8.25 | 1.0 |
| 10.25 | 1.5 |
| 11.0 | 2.0 |
| 11.25 | 2.5 |
| 11.55 | 3.0 |
| 11.67 | 3.5 |
| 11.83 | 4.0 |
| 12.12 | 4.5 |
| 12.58 | 5.0 |
| 13.45 | 5.5 |
| 15.67 | 6.0 |
| 22.50 | 6.5 |
| 36.0 | 6.8 |

Figure 3:
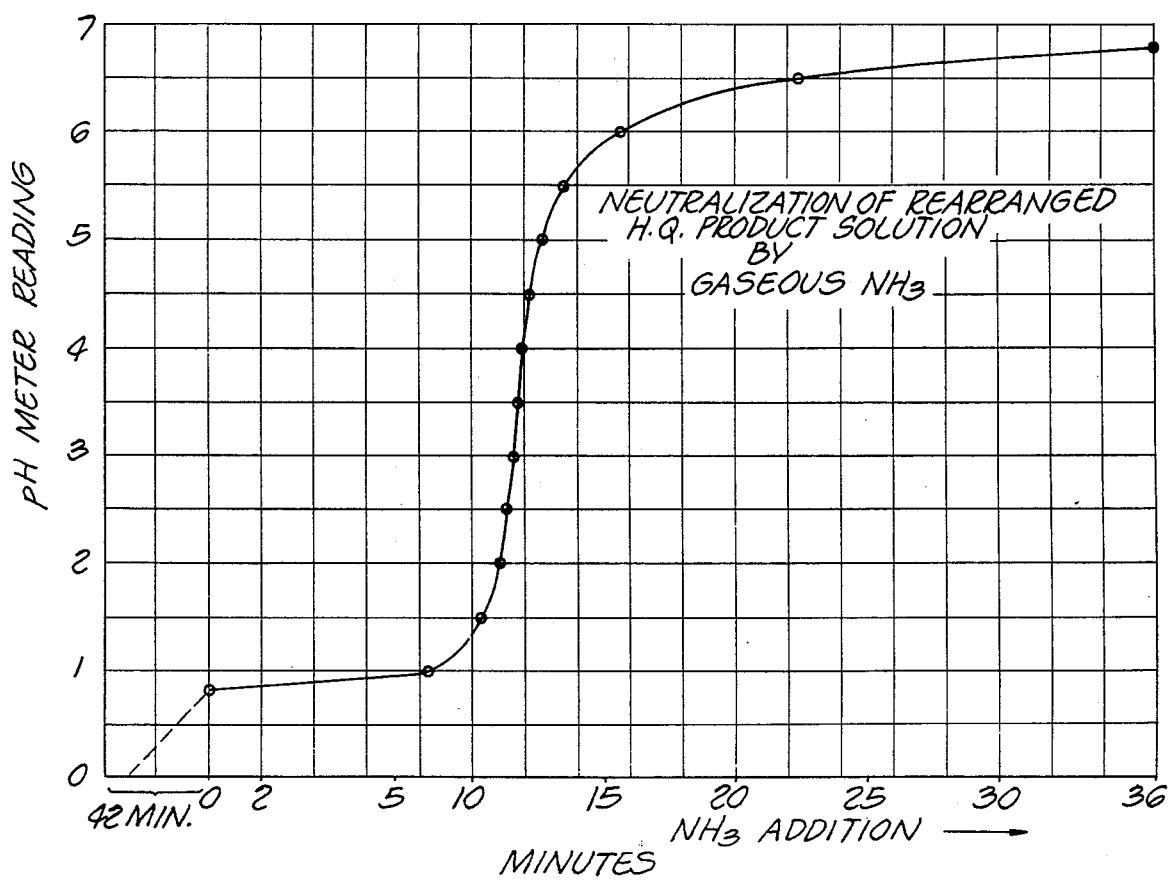
FIG. 3 is a graphical representation of a curve showing the relationship of the pH meter reading V.S. $NH_3$ addition.

The tabulated results are plotted in the curve shown in FIG. 3.

EXAMPLE V

The acidic rearranger product used in the following examples contained about 8 wt percent hydroquinone in a solvent composed of about one part benzene and two parts acetone. 400 g of the rearranger product containing 0.77 wt% $H_2SO_4$ was mixed with 30 g of water and neutralized to pH 3.7 with 4.13 g of conc. $NH_4OH$ (about 28% $NH_3$). An additional 0.22 g of $NH_4OH$ was required to complete the neutralization to pH 7. 10.9 g of aqueous phase containing 0.30 wt% HQ was formed after neutralization.

EXAMPLE VI 400 g of rearranger product plus 30 g of water was neutralized with about one-half the stoichiometric amount (2.14 g) of conc. $NH_4OH$ required for complete neutralization to give a pH of 1.2 in the organic phase. The aqueous phase (11.4 g) containing 1.36 wt percent HQ was separated from the mixture, and 10 ml of water was added back to the organic phase. The organic phase was further neutralized to pH 3.4 with 0.56 g of $NH_4OH$, but a separate water phase did not form.

EXAMPLE VII 400 g of rearranger product was neutralized to pH of 1.8 with 5.59 g of 25 percent NaOH solution. The solid salt was removed by decantation. An additional 4.28 g of 25 percent NaOH was required to neutralize to pH 3.4. The total NaOH used on a water-free basis was 2.46 g for neutralization to pH 3.4, and the calculated amount required for complete neutralization of 400 g of the product is 2.52 g.

EXAMPLE VIII 400 g of rearranger product was neutralized with 10 g of 25 percent CaO water slurry to a pH of 2.1. The solids were removed by decantation. An additional 13 g of the 25 percent lime slurry was required to neutralize to a 3.0 pH. No separate water phase formed.

EXAMPLE IX 400 g of rearranger product was neutralized with 22.2 g of a 25 percent solution of $Na_2CO_3$ to a pH of 1.95. The salt was removed by decantation. An additional 32.8 g of 25 percent $Na_2CO_3$ was required to bring the pH to 3.1. No separate water phase occurred, but the salt phase was a viscous fluid mass.

Examples II, III show the two stage neutralization process under anhydrous conditions and Examples V and VI show the applicability of the two stage process where the salts of neutralization are removed in a separate water phase. Examples VII, VIII, and IX show two-stage neutralization with NaOH, CaO and $Na_2CO_3$ respectively.

While my invention has been described above with a certain degree of particularity and with reference to certain details in order to describe a specific embodiment of my invention, it is to be understood that the scope of my claims should not be limited thereby but must be afforded the entire breadth of the appended claims.

I claim:

1. In a process for the production of a hydroxy aromatic compound wherein an alkyl aromatic hydroperoxide is rearranged in a substantially non-aqueous solvent using a sulfuric acid catalyst to produce a rearrangement product mixture containing said hydroxy aromatic compound, the improvement comprising:
  a. introducing into the rearrangement product mixture an amount of a basic anhydrous gas selected from the class consisting of ammonia, methyl amine, and triethyl amine in excess of that necessary to convert said sulfuric acid to a solid, substantially insoluble bisulfate compound but less than that necessary to convert all of said sulfuric acid to the corresponding sulfate,
  b. separating said bisulfate compound from said rearrangement product mixture and recovering a liquid product substantially free of said solid bisulfate compound,
  c. introducing into said liquid product an amount of a basic anhydrous gas selected from the class consisting of ammonia, methyl amine, and triethyl amine at least sufficient to convert any dissolved bisulfate compound to a substantially insoluble sulfate and to maintain a hydrogenion concentration in said rearrangement product mixture corresponding to an aqueous solution consisting of the neutralized product mixture diluted with an equal volume of water having a pH of from 3 to 6, and d. separating any solid sulfate compound from said liquid product.

2. The process of claim 1, wherein steps (a) and (c) are conducted at a temperature of from about 60° to about 200°F.

3. The process of claim 1, wherein said bisulfate compound is separated by centrifugation and said sulfate compound is separated by filtration.

4. The method of claim 1, wherein said non-aqueous solvent comprises primarily acetone.

5. The method of claim 1, wherein said hydroxy aromatic compound is hydroquinone and said alkyl aromatic hydroperoxide is p-diisopropylbenzene dihydroperoxide.

6. The process of claim 1, wherein said basic anhydrous gas comprises ammonia.

7. The process of claim 1, including the steps of monitoring the pH of the liquid product remaining after any solid sulfates are separated therefrom and controlling the amount of said basic anhydrous gas introduced in step (c) to maintain a hydrogenion concentration in said liquid product corresponding to an aqueous hydroquinone solution having a pH of from 3 to 6.

8. The process of claim 7, wherein said pH monitoring includes removing a slip stream from the liquid product remaining after the separation of any solid sulfate therefrom, diluting said slip stream with an equal amount of water and measuring the pH of the thus diluted slip stream.

9. The process of claim 7, wherein the amount of said basic anhydrous gas introduced in step (c) is sufficient to maintain the pH of said liquid product remaining after the separation of said solid sulfate in the range of 3–6.

10. In a process for the production of a hydroxy aromatic compound wherein an alkyl aromatic hydroperoxide is rearranged in a substantially non-aqueous solvent using a sulfuric acid catalyst to produce a rearrangement product mixture containing said hydroxy aromatic compound, the improvement comprising:

a. introducing into the rearrangement product mixture an amount of a basic material selected from the class consisting of ammonia, ammonium hydroxide, methyl amine, triethyl amine alkali and alkaline earth metal oxides, hydroxides, and carbonates in excess of that amount necessary to convert said sulfuric acid to a bisulfate compound but less than that necessary to convert all of said sulfuric acid to the corresponding sulfate, b. separating said bisulfate compound from said rearrangement product mixture and recovering a liquid product substantially free of said bisulfate compound, c. introducing into said liquid product an amount of a basic material selected from the class consisting of ammonia, ammonium hydroxide, methyl amine, triethyl amine, alkali and alkaline earth metal oxides, hydroxides and carbonates at least sufficient to convert any dissolved bisulfate compound to a sulfate and to maintain a hydrogenion concentration in said rearrangement product mixture corresponding to an aqueous solution consisting of the neutralized product mixture diluted with an equal volume of water having a pH of from 3 to 6, and d. separating any converted sulfate compound from said liquid product.

11. The process of claim 10, wherein steps (a) and (c) are conducted at a temperature of from about 60° to about 200° F.

12. The process of claim 10, wherein said basic material is introduced into said mixture in an aqueous solution and wherein said bisulfate compound dissolved in said aqueous solution and separated from said product mixture by phase separation.

13. The method of claim 10, wherein said hydroxy aromatic compound is hydroquinone and said alkyl aromatic hydroperoxide is p-diisopropylbenzene dihydroperoxide.

14. The process of claim 10, wherein said basic material is an ammonium hydroxide solution.

15. The process of claim 10, wherein said basic material is sodium hydroxide.

16. The process of claim 10, wherein the pH of said product mixture is maintained at approximately the pH of an aqueous solution of the salt formed by the reaction of said acid with said basic material.

17. The process of claim 10, wherein the pH of said product mixture is maintained at a value of from about 4.2 to 5.2.

* * * * *